US009442925B2

(12) United States Patent
Rekula et al.

(10) Patent No.: US 9,442,925 B2
(45) Date of Patent: Sep. 13, 2016

(54) REGULATED TEXTING SOLUTION FOR MOBILE DEVICES

(71) Applicant: Bank of America Corporation, Charlotte, NC (US)

(72) Inventors: Sravan Reddy Rekula, Lawrenceville, NJ (US); Venkat Pillay, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 595 days.

(21) Appl. No.: 13/683,454

(22) Filed: Nov. 21, 2012

(65) Prior Publication Data

US 2014/0143202 A1    May 22, 2014

(51) Int. Cl.
*G06F 17/30* (2006.01)
*H04L 12/58* (2006.01)

(52) U.S. Cl.
CPC ......... *G06F 17/30* (2013.01); *G06F 17/30997* (2013.01); *H04L 51/16* (2013.01)

(58) Field of Classification Search
CPC .................. G06F 17/30908; G06F 17/30554; G06F 17/3092; G06F 17/30914; G06F 17/30994; G06F 17/30997; G06F 17/30011; H04L 51/16
See application file for complete search history.

(56) References Cited

U.S. PATENT DOCUMENTS

| 6,317,751 | B1 * | 11/2001 | Yeger et al. .................. 707/661 |
| 7,194,516 | B2 * | 3/2007 | Giacobbe .......... G06F 17/30067 379/88.13 |
| 7,516,186 | B1 * | 4/2009 | Borghetti et al. ............. 709/206 |
| 8,078,158 | B2 | 12/2011 | Backholm ...................... 455/419 |
| 8,103,292 | B2 | 1/2012 | Kelly et al. ................ 455/456.4 |
| 8,166,299 | B2 | 4/2012 | Kemshall ....................... 713/170 |
| 2002/0161788 | A1 * | 10/2002 | McDonald .................... 707/203 |
| 2006/0053204 | A1 * | 3/2006 | Sundararajan et al. ...... 709/206 |
| 2006/0199598 | A1 | 9/2006 | Lee et al. ....................... 455/466 |
| 2006/0271630 | A1 * | 11/2006 | Bensky et al. ................ 709/206 |
| 2007/0073808 | A1 | 3/2007 | Berrey et al. ................. 709/204 |
| 2008/0070593 | A1 | 3/2008 | Altman et al. ................ 455/457 |
| 2008/0279381 | A1 | 11/2008 | Narendra et al. ............. 380/270 |
| 2009/0327972 | A1 * | 12/2009 | McCann et al. .............. 715/853 |
| 2010/0020972 | A1 | 1/2010 | Baugher et al. .............. 380/255 |
| 2010/0048231 | A1 * | 2/2010 | Donald et al. ................ 455/466 |
| 2011/0142071 | A1 * | 6/2011 | Farrell et al. ................. 370/473 |
| 2011/0143711 | A1 | 6/2011 | Hirson et al. ................. 455/410 |
| 2011/0269441 | A1 | 11/2011 | Silver ........................... 455/418 |
| 2011/0302408 | A1 | 12/2011 | McDermott et al. ......... 713/153 |
| 2013/0055099 | A1 * | 2/2013 | Yao ....................... G06Q 10/101 715/739 |
| 2013/0157699 | A1 * | 6/2013 | Talwar ................... H04L 51/38 455/466 |

* cited by examiner

Primary Examiner — James E Richardson
(74) Attorney, Agent, or Firm — Michael A. Springs

(57) ABSTRACT

A system for consolidating data messages includes a memory that stores data messages. Each of the data messages has a user field, an outside party field, and a timestamp field. The first data message's user field is associated with a first user, the outside party field is associated with a first outside party, and the timestamp field is associated with a first timestamp. The third data message's user field is associated with a first user, the outside party field is associated with a first outside party, and the timestamp field is associated with a third timestamp. A processor then groups the first data message and the third data message based at least in part upon the user field, outside party field, and timestamp field of each message. The processor then combines the first data message and the third data message into a consolidated data message.

21 Claims, 4 Drawing Sheets

FIG. 2A
From: User 1
To: Outside Party 1
Time: 1/1/12 5:37 am

Good morning, how are you?

FIG. 2B
From: User 1
To: Outside Party 2
Time: 1/1/12 9:30 am

Do you own stock XYZ?

FIG. 2C
From: User 1
To: Outside Party 1
Time: 1/1/12 6:58 pm

Good evening, how are you?

FIG. 2D
From: Outside Party 2
To: User 1
Time: 1/1/12 9:46 am

Yes, I have 1,000 shares of stock XYZ.

FIG. 2E
From: User 1
To: Outside Party 1
Time: 1/3/12 10:45 am

Lunch today?

FIG. 2F
From: User 1
To: Outside Party 2
Time: 1/1/12 9:53 am

Sell all 1,000 shares immediately.

FIG. 2G
From: Outside Party 1
To: User 1
Time: 1/1/12 11:45 pm

Very well, thank you.

FIG. 2H
From: Outside Party 1
To: User 1
Time: 1/3/12 11:00

Sure, see you at 11:30.

FIG. 2I
From: Outside Party 2
To: User 1
Time: 1/1/12 10:07 am

Shares sold.

FIG. 2J
From: Outside Party 1
To: User 1
Time: 1/2/12 12:37 pm

Have any good stock picks?

FIG. 2K
From: User 1
To: Outside Party 1
Time: 1/2/12 1:00 pm

Stock XYZ is a great buy.

Date: 1/1/12
Parties: Outside Party 1, User 1

User 1 (5:37 am): Good morning, how are you?

User 1 (6:58 pm): Good evening, how are you?

OP 1 (11:45 pm): Very well, thank you.

FIG. 3A

Date: 1/1/12
Parties: Outside Party 2, User 1

User 1 (9:30 am): Do you own stock XYZ?

OP 2 (9:46 am): Yes, I have 1,000 shares of stock XYZ.

User 1 (9:53 am): Sell all 1,000 shares immediately.

OP 2 (10:07 am): Shares sold.

FIG. 3B

Date: 1/2/12
Parties: Outside Party 1, User 1

OP 1 (12:37 pm): Have any good stock picks?

User 1 (1:00 pm): Stock XYZ is a great buy.

FIG. 3C

Date: 1/3/12
Parties: Outside Party 1, User 1

User 1 (10:45 am): Lunch today?

OP 1 (11:00 am): Sure, see you at 11:30.

FIG. 3D

REGULATED TEXTING SOLUTION FOR MOBILE DEVICES

TECHNICAL FIELD

This disclosure relates generally to information analysis, information organization, and, more particularly, to a regulated texting solution for mobile devices.

BACKGROUND

Government regulators or other authorities may require an entity to preserve all communications sent or received by its employees in certain circumstances. For certain kinds of communications, the task of capturing and preserving this data is trivial. However, with the advent of new informal methods of communication like SMS text messaging and social media messaging, the task becomes much more difficult. When employees utilize these alternative methods of communication, their communications may not be preserved, causing the entity to risk non-compliance with government regulations.

SUMMARY

According to embodiments of the present disclosure, disadvantages and problems associated with previous systems may be reduced or eliminated.

According to one embodiment, a system for consolidating a plurality of data messages includes a memory and a processor communicatively coupled to the memory. The memory stores a plurality of data messages. Each of the data messages has a user field, an outside party field, and a timestamp field. The first data message's fields are arranged as follows: the user field is associated with a first user, the outside party field is associated with a first outside party, and the timestamp field is associated with a first timestamp. The second data message's fields are arranged as follows: the user field is associated with a second user, the outside party field is associated with a second outside party, and the timestamp field is associated with a second timestamp. The third data message's fields are arranged as follows: the user field is associated with a first user, the outside party field is associated with a first outside party, and the timestamp field is associated with a third timestamp. The processor groups the first data message and the third data message based at least in part upon the user field, outside party field, and timestamp field of each message. The processor then combines the first data message and the third data message into a consolidated data message.

According to another embodiment, a method for consolidating a plurality of data messages includes storing a plurality of data messages. Each of the data messages has a user field, an outside party field, and a timestamp field. The first data message's fields are arranged as follows: the user field is associated with a first user, the outside party field is associated with a first outside party, and the timestamp field is associated with a first timestamp. The second data message's fields are arranged as follows: the user field is associated with a second user, the outside party field is associated with a second outside party, and the timestamp field is associated with a second timestamp. The third data message's fields are arranged as follows: the user field is associated with a first user, the outside party field is associated with a first outside party, and the timestamp field is associated with a third timestamp. The first and third data messages are then grouped based at least in part upon the user field, outside party field, and timestamp field of each message. The first and third data messages are then combined into a consolidated data message.

According to another embodiment, a system for consolidating data messages includes an application and a server. The application is stored in a memory and, when executed by a processor, detects if a data message is sent or received by a device, creates a copy of the data message, and transmits the copy of the data message to a server. Each data message has a user field, an outside party field, and a timestamp field. The server has a server memory communicatively coupled to a server processor. The server processor receives copies of a plurality of data messages and stores them in the server memory. The server processor also groups a plurality of messages from the copies of data messages based at least in part upon the user field, the outside party field, and the timestamp field of each of the copies of data messages. The processor then combines the plurality of messages into a consolidated data message.

Certain embodiments of the disclosure may provide one or more technical advantages. For example, consolidated data messages may be arranged such that the context of a conversation between two parties is more easily ascertainable. As another example, all data messages sent or received by a mobile device are guaranteed to be archived for compliance purposes.

In certain embodiments, the consolidated message may consume less space in memory than the individual data messages would if not consolidated, thereby reducing the memory required by the system to store data messages.

In other embodiments, the server aggregates data messages before transmitting them, thereby conserving they system's bandwidth and computation resources over a system that transmits data messages without aggregation.

In yet another embodiment, aggregating data messages before consolidating them may allow the system to conserve processing power by allowing the system to process a batch of data messages all at once instead of processing each data message as it arrives.

In yet another embodiment, the server sends a confirmation of receipt of a data message to a device, allowing the device to delete local copies of data messages. This may conserve memory resources on the device over systems that lack confirmation of receipt of a data message.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2*a*-2*k* illustrate an example set of data messages that the system of FIG. 1 may consolidate;

FIGS. 3*a*-3*d* illustrate an example set of consolidated data messages that may result after the system of FIG. 1 consolidates the example set of data messages illustrated in FIGS. 2*a*-2*k.

DETAILED DESCRIPTION

Embodiments of the present disclosure and its advantages are best understood by referring to FIGS. 1 through 4 of the drawings, like numerals being used for like and corresponding parts of the various drawings.

This disclosure describes a system for consolidating data messages. In certain embodiments, an application running on a device monitors that device's activities and detects when the device sends or receives a data message. Sometimes, these data messages may be SMS, MMS, HTML, or some other format of text message. When the application detects the transmission or receipt of a data message, it makes a copy of the data message and stores it in local memory. Next, the application attempts to make a connection to an internal server. If the application fails to connect to the internal server, the application waits and tries to connect again later. When the application successfully connects to the internal server, the application transmits the local copy of the data message to the internal server, which forwards any received transmissions to an aggregation server.

At the aggregation server, numerous data messages may be received from a variety of different sources. After aggregating these data messages, the aggregation server transmits them to another server—the consolidation server. The consolidation server groups some of the data messages for consolidation according to a set of criteria. For instance, the criteria could instruct the consolidation server to group all data messages that share the same parties as either the sender or receiver of the message. In other words, the consolidation server would group those messages that were sent back and forth between the same two parties. Additionally, the criteria could instruct the consolidation server to group data messages that were sent within a particular time frame. For instance, the criteria could instruct the consolidation server to group only those data messages which were sent during a particular twenty-four-hour day. One or more such rules may be specified by the criteria.

After grouping the data messages that meet the criteria, the consolidation server may then combine the grouped data messages into a consolidated message. In some instances, the consolidation server may arrange the messages in chronological order before appending them together. In other instances, the consolidation server may combine the messages such that the consolidated message reads like a conversation between the two parties. By doing so, the consolidation server allows a user who reads the consolidated message to better understand the context of each data message. This consolidation process may significantly simplify the compliance checking process for data messages sent or received by devices.

Figure 1:
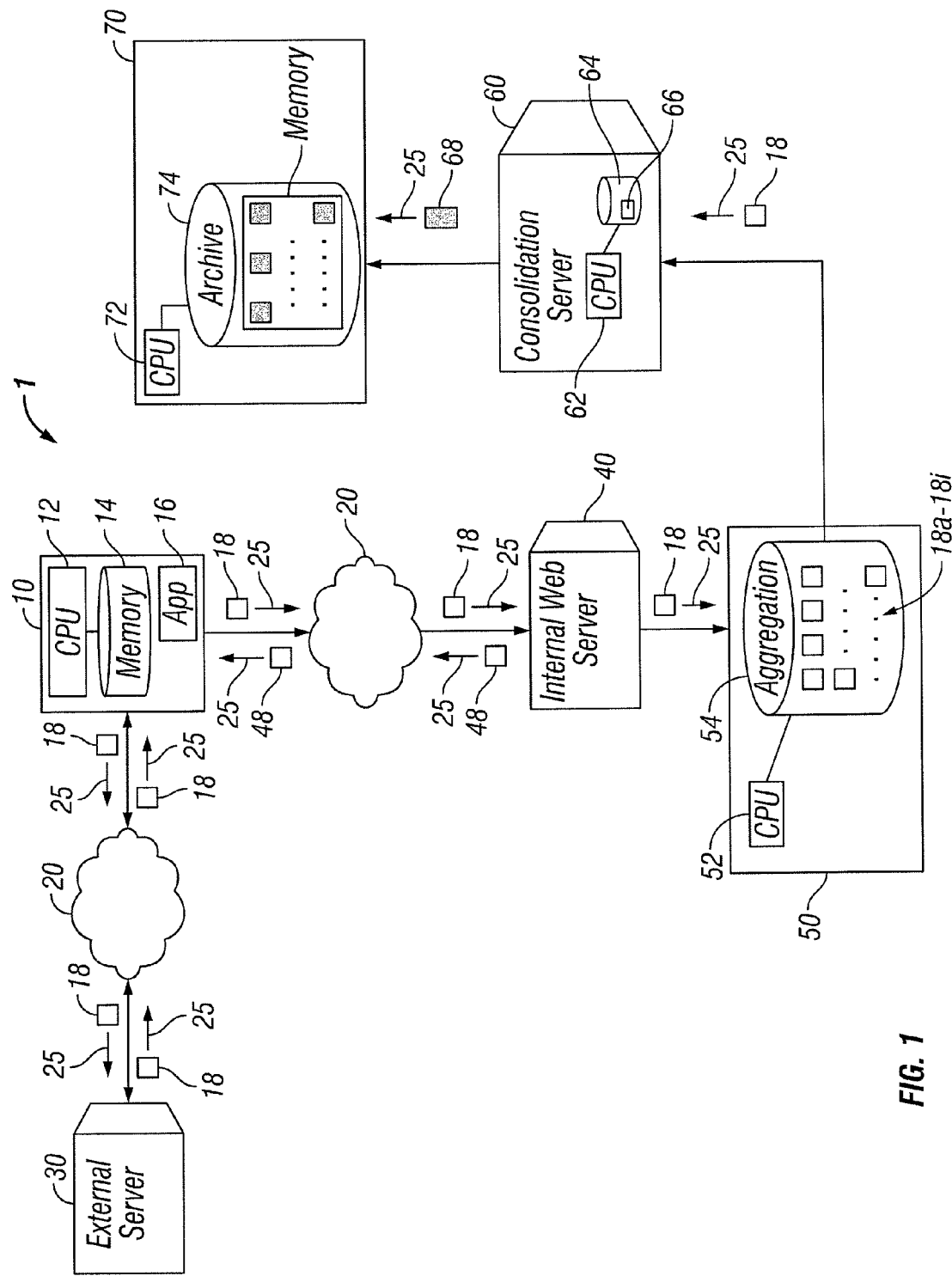
FIG. 1 illustrates a system for consolidating data messages.

FIG. 1 illustrates a system 1 for consolidating data messages in certain embodiments. System 1 may include a device 10 connected to an external server 30 and an internal server 40 through a network 20. Device 10 may be capable of sending data messages 18 through network 20 to external server 30 and internal server 40. Device 10 may also be capable of receiving data messages 18 from network 20 sent by external server 30 and internal server 40. Internal server 40 is communicatively coupled to an aggregation server 50 and may transmit data messages 18 to aggregation server 50. Aggregation server 50 may store a plurality of data messages 18 and transmit the plurality of data messages 18, at specified times, to a consolidation server 60. Consolidation server 60 may group certain of the plurality of data messages 18 according the data messages' 18 characteristics that satisfy certain consolidation server criteria 66. These data messages 18 may be grouped and combined into a consolidated data message 68. Consolidation server 60 may then transmit the consolidated data message 68 to an archive server 70. Archive server 70 may store at least one consolidated data message 68 and allow a user to search or sort the at least one consolidated data message 68.

Device 10 may include a device processor 12, a device memory 14, and a device application 16. Device processor 12 may be communicatively coupled to device memory 14. Device application 16 may be stored within device memory 14 or in some other part or component of device 10. Device 10 may store one or more data messages 18 in device memory 14. In some embodiments, device processor 12 may create additional copies of data message 18. The original data message 18 as well as any copies of data message 18 may be stored within device memory 14. Device application 16 may, when executed by device processor 12, monitor activity on the device 10, detect when a data message 18 is sent or received by device 10, and instruct device processor 12 to make a copy of data message 18 and store that copy of data message 18 in device memory 14. By detecting when a data message 18 is sent or received by device 10 and making a copy of the data message 18, system 1 may aid in the retention of data messages 18 for compliance purposes without interfering with the normal operation of device 10.

Device 10 can be any device capable of sending or receiving a data message 18. Device 10 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of the system. Device 10 may also include a user interface, such as a display, a touchscreen, a microphone, keypad, or other appropriate terminal equipment usable by a user. Although FIG. 1 illustrates the system as including only one device 10, the system may include any suitable number of devices 10.

Device processor 12 may include any hardware and/or software that operates to control and process information. Device processor 12 may be a programmable logic device, a microcontroller, a microprocessor, any suitable processing device, or any suitable combination of the preceding.

Device memory 14 may store, either permanently or temporarily, data, operational software, or other information for device processor 12. Device memory 14 may include any one or a combination of volatile or non-volatile local or remote devices suitable for storing information. For example, device memory 14 may include random access memory (RAM), read only memory (ROM), magnetic storage devices, optical storage devices, or any other suitable information storage device or a combination of these devices.

Device application 16 may refer to any software application running on any computing device that is capable of detecting the transmission or receipt of a data message 18. Device application 16 may be encoded in one or more tangible, non-transitory media and may perform operations when executed by a computer. Device application 16 may include a computer program, software, computer executable instructions, and/or instructions capable of being executed by device processor 12.

Data message 18 may include any electronic transmission that carries data, such as a simple mail transfer protocol (SMTP) message, a short message service (SMS) message, a network packet, a computer file, an email, an HTML request, an XML request, a JSON request, or a combination of these or other suitable transmissions. The data contained in data message 18 may include the phone number of the sender, the email address of the sender if known, the phone number of the recipient, the email address of the recipient if known, the time and date that the data message 18 was transmitted, the body of the message, or any other suitable data. Device 10, in some embodiments, is communicatively coupled to an external server 30 through a network 20. In certain embodiments, device processor 12 may be operable to create a communication 25 containing a data message 18 and transmit it to external server 30 through network 20. Alternatively, device processor 12 may be operable to receive a communication 25 containing a data message 18 sent by external server 30 through network 20. External server 30, upon receiving data message 18 from device 10 may send data message 18 to its intended recipient. For instance, the user of device 10 may want to transmit an SMS message to an outside party. Device processor 12 may be operable to create a communication 25 containing the SMS message and transmit it to external server 30 through network 20. External server 30 would then send the SMS message to the outside party through any appropriate communication channel. Alternatively, external server 30, upon receiving data message 18 from an outside party may send data message 18 to device 10 through network 20. External server 30 may include any server capable of sending or receiving data messages. In certain embodiments, external server 30 is an SMS gateway provided by a wireless service provider.

This disclosure contemplates any suitable network 20 operable to facilitate communication between the components of the system. Network 20 may include any interconnecting system capable of transmitting audio, video, signals, data, messages, or any combination of the preceding. Network 20 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 20 may additionally include any combination of gateways, routers, hubs, switches, access points, base stations, wireless telephone systems and any other hardware, software or a combination thereof.

Device 10 may also be communicatively coupled to an internal server 40 through network 20. In certain embodiments, device processor 12 may be operable to create a communication 25 containing a data message 18 and transmit it to internal server 40 through network 20. In some embodiments, device processor 12 may transmit the copy of data message 18 stored in device memory 14. Transmission of this data message 18 may occur when device application 16 creates a successful connection to internal server 40 in some embodiments. If the device application 16 fails to connect to the internal server 40, the device application 16 may wait and try to connect again later. When the device application 16 successfully connects to the internal server 40, the device application 16 may transmit the copy of the data message 18 or any other data message 18 to the internal server 40.

Alternatively, device processor 12 may be operable to receive a communication 25 containing a data message 18 or any other message sent through network 20 by internal server 40 in certain embodiments. For instance, internal server 40 may create a confirmation message 48 and transmit it to device 10. This confirmation message 48 could inform device 10 that device's 10 transmission of data message 18 to internal server 40 was successful. Upon receiving this confirmation message 48, device 10 may delete the copy of data message 18 from device memory 14. This process of sending and receiving the confirmation message 48 may allow the device 10 to delete local copies of data messages 18, thus conserving memory resources on device 10 over systems that lack confirmation messages 48. After receiving data message 18, internal server 40 may create a communication 25 containing data message 18 and transmit it to aggregation server 50.

Aggregation server 50 includes an aggregation server processor 52 and aggregation server memory 54. Aggregation server processor 52 may be communicatively coupled with aggregation server memory 54. Aggregation server memory 54 is capable of storing at least one data message 18. In certain embodiments, aggregation server memory 54 may store a plurality of data messages 18; the plurality of data messages 18 is illustrated as data messages 18a-18i in FIG. 1.

Aggregation server processor 52 may include any hardware and/or software that operates to control and process information. Aggregation server processor 52 may be a programmable logic device, a microcontroller, a microprocessor, any suitable processing device, or any suitable combination of the preceding.

Aggregation server memory 54 may store, either permanently or temporarily, data, operational software, or other information for aggregation server processor 52. Aggregation server memory 54 may include any one or a combination of volatile or non-volatile local or remote devices suitable for storing information. For example, aggregation server memory 54 may include random access memory (RAM), read only memory (ROM), magnetic storage devices, optical storage devices, or any other suitable information storage device or a combination of these devices.

Aggregation server 50 may be communicatively coupled to a consolidation server 60 through network 20 or through any other appropriate connection. Aggregation server processor 52 may be operable to create a communication 25 containing data messages 18a-18i and then transmit the communication 25 to a consolidation server 60.

Consolidation server 60 includes a consolidation server processor 62 and a consolidation server memory 64. Consolidation server processor 62 may be communicatively coupled to consolidation server memory 64.

Consolidation server processor 62 may include any hardware and/or software that operates to control and process information. Consolidation server processor 62 may be a programmable logic device, a microcontroller, a microprocessor, any suitable processing device, or any suitable combination of the preceding.

Consolidation server memory 64 may store, either permanently or temporarily, data, operational software, or other information for consolidation server processor 62. Consolidation server memory 64 may include any one or a combination of volatile or non-volatile local or remote devices suitable for storing information. For example, consolidation server memory 64 may include random access memory (RAM), read only memory (ROM), magnetic storage devices, optical storage devices, or any other suitable information storage device or a combination of these devices.

Additionally, consolidation server 60 may include consolidation server criteria 66, which may be stored in consolidation server memory 64; the consolidation server criteria 66 instructs consolidation server processor 62 on how data messages 18a-18i should be consolidated into at least one consolidated message 68. Consolidation server processor 62 may then combine data messages 18a-18i into at least one consolidated message 68. Consolidation server 60 may be communicatively coupled to an archive server 70 through network 20 or any other appropriate connection. After creating at least one consolidated message 68, consolidation server processor 62 may create a communication 25 containing the at least one consolidated message 68 and transmit it to archive server 70.

In some embodiments, consolidated message 68 contains data from one or more data messages 18a-18i. The data contained within consolidated message 68 is determined based upon the consolidation server criteria 66. The consolidated message 68 may contain certain headers. These headers may include the sender's phone number, the sender's email address, the receiver's phone number, the receiver's email address, the type of message, and/or the time and date that the message was transmitted. Consolidated message 68 may be sent in SMTP email format or in any other appropriate format.

Archive server 70 includes archive server processor 72 and archive server memory 74. Archive server processor 72 may be communicatively coupled with archive server memory 74. Archive server 70 may, in some embodiments, display one or more of consolidated messages 68 to a user for monitoring, management, or any other appropriate purpose.

Archive server processor 72 may include any hardware and/or software that operates to control and process information. Archive server processor 72 may be a programmable logic device, a microcontroller, a microprocessor, any suitable processing device, or any suitable combination of the preceding.

Archive server memory 74 may store, either permanently or temporarily, data, operational software, or other information for archive server processor 72. Archive server memory 74 may include any one or a combination of volatile or non-volatile local or remote devices suitable for storing information. For example, archive server memory 74 may include random access memory (RAM), read only memory (ROM), magnetic storage devices, optical storage devices, or any other suitable information storage device or a combination of these devices.

In operation, device application 18 running on device 10 monitors device's 10 activities and detects when the device 10 sends or receives a data message 18. Sometimes, these data messages 18 may be SMS, MMS, HTML, or some other format of text message. When the device application 18 detects the transmission or receipt of a data message 18, it makes a copy of the data message 18 and stores it in device memory 14. Next, the application attempts to make a connection to internal server 40. If the device application 16 fails to connect to the internal server 40, the device application 16 waits and tries to connect again later. When the device application 16 successfully connects to the internal server 40, the device application 16 transmits the local copy of the data message 18 to the internal server 40, which forwards any received transmissions to the aggregation server 50.

At the aggregation server 50, numerous data messages 18 may be received from a variety of different sources, such as a plurality of devices 10. After aggregating these data messages 18, the aggregation server 50 transmits them to another server—the consolidation server 60. By transmitting data messages 18 after aggregation instead of individually, the aggregation server 50 may reduce the amount of bandwidth and computational resources consumed by system 1 in some embodiments.

The consolidation server 60 groups some of the data messages 18 for consolidation according to a set of consolidation server criteria 66. For instance, the consolidation server criteria 66 could instruct the consolidation server 60 to group all data messages 18 that share the same parties as either the sender or receiver of the message. In other words, the consolidation server 60 would group those data messages 18 that were sent back and forth between the same two parties. Additionally, the consolidation server criteria 66 could instruct the consolidation server to group data messages 18 that were sent within a particular time frame. For instance, the consolidation server criteria 66 could instruct the consolidation server 60 to group only those data messages 18 which were sent during a particular twenty-four-hour day. One or more such rules may be specified by the consolidation server criteria 66.

After grouping the data messages 18 that satisfy the consolidation server criteria 66, the consolidation server 66 may then combine the grouped data messages 18 into a consolidated message 68. In some instances, the consolidation server 60 may arrange the data messages 18 in chronological order before appending them together. In other instances, the consolidation server 60 may combine the data messages 18 such that the consolidated message 68 reads like a conversation between the two parties. In some embodiments, consolidated message 68 may consume less memory than would be consumed by the data messages 18 that consolidated message 68 contains. Thus, in certain embodiments, the consolidation process utilized by system 1 may reduce the amount of memory space required to store data messages 18. In certain other embodiments, aggregating data messages 18 before consolidating them may allow the system 1 to conserve processing power by allowing the system to process a batch of data messages 18 all at once instead of processing each data message 18 as it arrives.

In certain embodiments, device processor 12 executes device application 16. Device application 16 monitors activity on device 10 and detects when a communication 25 containing a data message 18 is sent or received by device 10. When this occurs, device application 16 directs device processor 12 to make a copy of data message 18 and store that copy of data message 18 in device memory 14. Device application 16 then attempts to connect to internal server 40. If a connection cannot be made, the application waits and tries again later. If device application 16 successfully connects to internal server 40, device application 16 directs device processor 12 to create a communication 25 containing the copy of data message 18 and transmit it to internal server 40 through network 20. The connection between device 10 and internal server 40 in some embodiments may be a proprietary connection made over a separate communication channel from those normally used by device 10. Device 10 may use XML, web services, HTML, or any other proper technique to create the connection between device 10 and internal server 40.

In some embodiments, device application 16 monitors device 10 and detects when a confirmation message 48 is received by device 10. The confirmation message 48 informs device application 16 that the transmission of communication 25 containing the copy of data message 18 to internal server 40 was successful. Device application 16 may then instruct device processor 12 to delete the copy of data message 18 from device memory 14. This process of sending and receiving the confirmation message 48 may allow the device 10 to delete local copies of data messages 18, thus conserving memory resources on device 10 over systems that lack confirmation messages 48.

In certain embodiments, device application 16 is able to map data stored in data message 18 to other data stored within device memory 14. For example, data message 18 may contain data about the sender of the message. In certain embodiments, this data may be in the form of a phone number. Device memory 14 may store information that maps phone numbers to email addresses. Device application 16 may instruct device processor 12 to search for a phone number contained in a data message 18 and retrieve the associated email address from device memory 14. Device application 16 may then store data message 18 with the phone number data or email address data or both. For example, device processor 12 could determine that the sender of data message 18 has phone number of 555-555-5555. Device memory 14 contains an entry that associates phone number 555-555-5555 with email address user1@user1.com. Device processor 12 could then store data message 18 and include this extra data. In certain embodiments, the same process may be repeated for the sender's phone number, the receiver's phone number, or any other data within data message 18.

Device application 16 may detect when device 10 or device processor 12 is preparing to transmit a data message 18 to external server 30 through network 20. In some embodiments, device application 16 may append additional data into data message 18 before its transmission. For instance, many regulatory agencies require that employees engaged in certain activities write disclaimers in their communications with clients. Device application 16 could help employees remain compliant by injecting a disclaimer into each data message 18 sent to a client. In certain embodiments, this could be accomplished by injecting a small uniform resource locator (URL) at the end of each data message 18 before transmission to a client. This small URL would point to a page that contained a full disclaimer or other information as required by federal law, state law, or other laws or regulations.

After receiving communication 25 containing data message 18, internal server 40 may create a communication 25 containing data message 18 and transmit it to aggregation server 50. In some embodiments, internal server 40 may forward the communication 25 sent by device 10 to aggregation server 50. In other embodiments, internal server 40 and aggregation server 50 may be collocated or part of the same machine or server.

Aggregation server processor 52, upon receipt of data message 18 stores data message 18 in aggregation server memory 54. Aggregation server memory 54 may already contain multiple data messages 18 from device 10 or from other devices or other sources. As illustrated in FIG. 1, aggregation server memory 54 contains data messages 18*a*-18*i*. Aggregation server 50 holds these messages for a specified time, which may be configurable according to business rules or set manually by a user. After the specified time has elapsed, aggregation server processor 52 creates a communication 25 containing data messages 18*a*-18*i* and transmits communication 25 to consolidation server 60. Aggregation server processor 52 may instruct aggregation server memory 54 to delete data messages 18*a*-18*i* from aggregation server memory 54 after the successful transmission of communication 25. However, in other embodiments, data messages 18*a*-18*i* may be preserved in aggregation server memory 54 for redundancy, debugging, or other suitable purposes. In some embodiments, aggregation server processor 52 may determine a time zone associated with each of the data messages 18*a*-18*i*. Aggregation server processor 52 may then convert the timestamps associated with each of the data messages 18*a*-18*i* to a uniform time zone. Alternatively, this process may be carried out by the consolidation server processor 62 or any other suitable component of the system described by this disclosure.

Consolidation server processor 62 receives communication 25 containing data messages 18*a*-18*i* and stores data messages 18*a*-18*i* in consolidation server memory 64. Consolidation server processor 62 may then group data messages 18*a*-18*i* in accordance with consolidation server criteria 66. For instance, consolidation server criteria 66 may instruct consolidation server processor 62 to group together all data messages which were sent between a certain user and a certain outside party within a certain 24 hour period. Upon grouping the messages as instructed by consolidation server criteria 66, consolidation server processor 62 then combines the grouped data messages 18 into a consolidated message 68. An example of the grouping and combining process will be shown in FIGS. 2*a* through 2*k* along with FIGS. 3*a* through 3*d*. In some embodiments, consolidation server processor 62 may retain characters from data messages 18*a*-18*i* in their original form. In other embodiments, consolidation server processor 62 may perform character encoding on the contents of data messages 18*a*-18*i*. The grouping and consolidating process may occur daily in some embodiments. However, any frequency of the grouping and consolidating process is envisioned by this disclosure.

Consolidation server processor 62 may inject certain headers into consolidated message 68. For instance, the headers may include the sender's phone number or email address, the receiver's phone number or email address, the type of message involved, or the time or date that the message was sent or received. By consolidating grouped data messages 18*a*-18*i* into at least one consolidated message 68, consolidation server processor 62 allows a user or supervisor who reads the at least one consolidated message 68 to gain the context of the conversation between sender and receiver and better understand their communications. Consolidation server processor 62 may create a communication 25 containing at least one consolidated message 68 and transmit it in SMTP format or any other suitable format to archive server 70. Consolidation server processor 62 may insert special headers into communication 25 or into consolidated message 68 to inform archive server 70 of the contents of the communication.

When archive server processor 72 receives a consolidated message 68, it stores it in archive server memory 74. Archive server memory 74 may store one or more consolidated messages 68. Archive server processor 72, in certain embodiments, may display the consolidated messages 68 to a user or supervisor. Indeed, in other embodiments, archive server processor 72 may allow a supervisor or other user to sort the consolidated messages 68 according to headers or to search the contents or headers of at least one consolidated message 68.

FIGS. 2*a* through 2*k* illustrate an example set of data messages 18 that may be sent or received by device 10 and later stored in aggregation server memory 54 or in consolidation server memory 64. Each data message 18 in FIGS.

2*a*-2*k* contains certain information regarding the recipient, the sender, and date and time the message was transmitted. Each data message 18 also contains a message body. In FIG. 2*a*, the sender is User 1, the recipient is Outside Party 1, the date was Jan. 1, 2012. In FIG. 2*b*, the sender was User 1, the recipient was Outside Party 2 and the date was Jan. 1, 2012. In FIG. 2*c*, the sender was User 1, the recipient was Outside Party 1, and the date was Jan. 1, 2012. In FIG. 2*d*, the sender was Outside Party 2, the recipient was User 1, and the date was Jan. 1, 2012. In FIG. 2*e*, the sender was User 1, the recipient was Outside Party 1, and the date was Jan. 3, 2012. In FIG. 2*f*, the sender was User 1, the recipient was Outside Party 2, and the date was Jan. 1, 2012. In FIG. 2*g*, the sender was Outside Party 1, the recipient was User 1, and the date was Jan. 1, 2012. In FIG. 2*h*, the sender was Outside Party 1, the recipient was User 1, and the date was Jan. 3, 2012. In FIG. 2*i*, the sender was Outside Party 2, the recipient was User 1, and the date was Jan. 1, 2012. In FIG. 2*j*, the sender was Outside Party 1, the recipient was User 1, and the date was Jan. 2, 2012. In FIG. 2*k*, the sender was User 1, the recipient was Outside Party 1, and the date was Jan. 2, 2012.

As illustrated in FIGS. 2*a*-2*k*, it is difficult to understand the context of the conversation between User 1 and Outside Party 1, especially as separated from the conversation between User 1 and Outside Party 2. Further, it is difficult to determine in which order the communications were sent and received, which communications are part of a string of conversation between each party, and what constitutes the context of each conversation. It is even more difficult in real-world situations in which the numbers of users and outside parties may reach greater numbers than can be illustrated here.

FIGS. 3*a*-3*d* illustrate the consolidated messages 68 that may be created from the data messages 18 illustrated in FIGS. 2*a*-2*k* if certain consolidation server criteria 66 is utilized. In this example, the consolidation server criteria 66 instructs the consolidation server processor 62 to group those data messages 18 illustrated in FIGS. 2*a*-2*k* that share a common sender and receiver and have been sent or received within a single twenty-four-hour period ending at midnight. For instance, in FIG. 3*a*, the consolidated server processor 62 has grouped those data messages 18 sent and received by User 1 and Outside Party 1 during the twenty-four-hour period corresponding to Jan. 1, 2012. The consolidation server processor 62 inserts the date, the parties to the conversation, the time of each communication, and the message body into consolidated message 68 as illustrated in FIG. 3*a*. Specifically, the consolidation server processor 62 chooses the first data message 18 between Outside Party 1 and User 1 that was sent on Jan. 1, 2012, in this case, the data message 18 illustrated in FIG. 2*a*. The consolidation server processor 62 inserts an identifier associated with the sender (e.g., a phone number, email address, name, etc.) the time the message was transmitted, and the message body. The consolidation server processor 62 then finds the next message in chronological order that was sent between Outside Party 1 and User 1 on Jan. 1, 2012, in this case, the data message 18 illustrated in FIG. 2*c*. The consolidation server processor 62 then inserts an identifier associated with that sender (e.g., a phone number, email address, name, etc.) the time that message was transmitted, and the message body. Finally, the consolidation server processor 62 finds the final data message 18 that was sent between Outside Party 1 and User 1 on Jan. 1, 2012, in this case, the data message illustrated in FIG. 2*g*. The consolidation server processor 62 inserts an identifier associated with the sender (e.g., a phone number, email address, name, etc.) the time the message was transmitted, and the message body. Thus, the consolidated message 68 illustrated in FIG. 3*a* contains data from the data messages 18 illustrated in FIG. 2*a*, FIG. 2*c*, and FIG. 2*g*.

Similarly, FIG. 3*b* illustrates a series of related communications between Outside Party 2 and User 1 on Jan. 1, 2012. Again, the consolidation server criteria 66 instructs the consolidation server processor 62 to group those data messages 18 illustrated in FIGS. 2*a*-2*k* that share a common sender and receiver and have been sent or received within a single twenty-four-hour period ending at midnight. In the same way, the consolidation server processor 62 groups the appropriate data messages 18 as directed by consolidation server criteria 66. The data messages from FIGS. 2*a*-2*k* that are grouped for FIG. 3*b* are FIG. 2*b*, FIG. 2*d*, FIG. 2*f*, and FIG. 2*i*.

FIG. 3*c*, on the other hand, groups those messages that were sent between Outside Party 1 and User 1 on Jan. 2, 2012. Again, the consolidation server criteria 66 instructs the consolidation server processor 62 to group those data messages 18 illustrated in FIGS. 2*a*-2*k* that share a common sender and receiver and have been sent or received within a single twenty-four-hour period ending at midnight. The messages from FIGS. 2*a*-2*k* that are grouped for FIG. 3*c* are FIGS. 2*j* and 2*k*.

Finally, FIG. 3*d* illustrates a series of related communications between Outside Party 1 and User 1 on Jan. 3, 2012. Again, the consolidation server criteria 66 instructs the consolidation server processor 62 to group those data messages 18 illustrated in FIGS. 2*a*-2*k* that share a common sender and receiver and have been sent or received within a single twenty-four-hour period ending at midnight. The consolidation server processor 62 groups the appropriate data messages as directed by consolidation server criteria 66. The data messages from FIGS. 2*a*-2*k* that are grouped for FIG. 3*d* are FIGS. 2*e* and 2*h*.

As illustrated by FIGS. 3*a*-3*d*, the grouping and consolidating process substantially improves the readability of the conversations between User 1 and Outside Party 1 and User 1 and Outside Party 2. The context of each conversation can be easily seen, allowing for much more efficient monitoring and compliance checking. Certain embodiments may reduce the expenditure of time and resources in communications monitoring or other areas. The consolidation server criteria used in FIGS. 2*a*-2*k* and FIGS. 3*a*-3*d* are for illustrative purposes and are not the only consolidation server criteria considered in accordance with the present disclosure.

Figure 4:
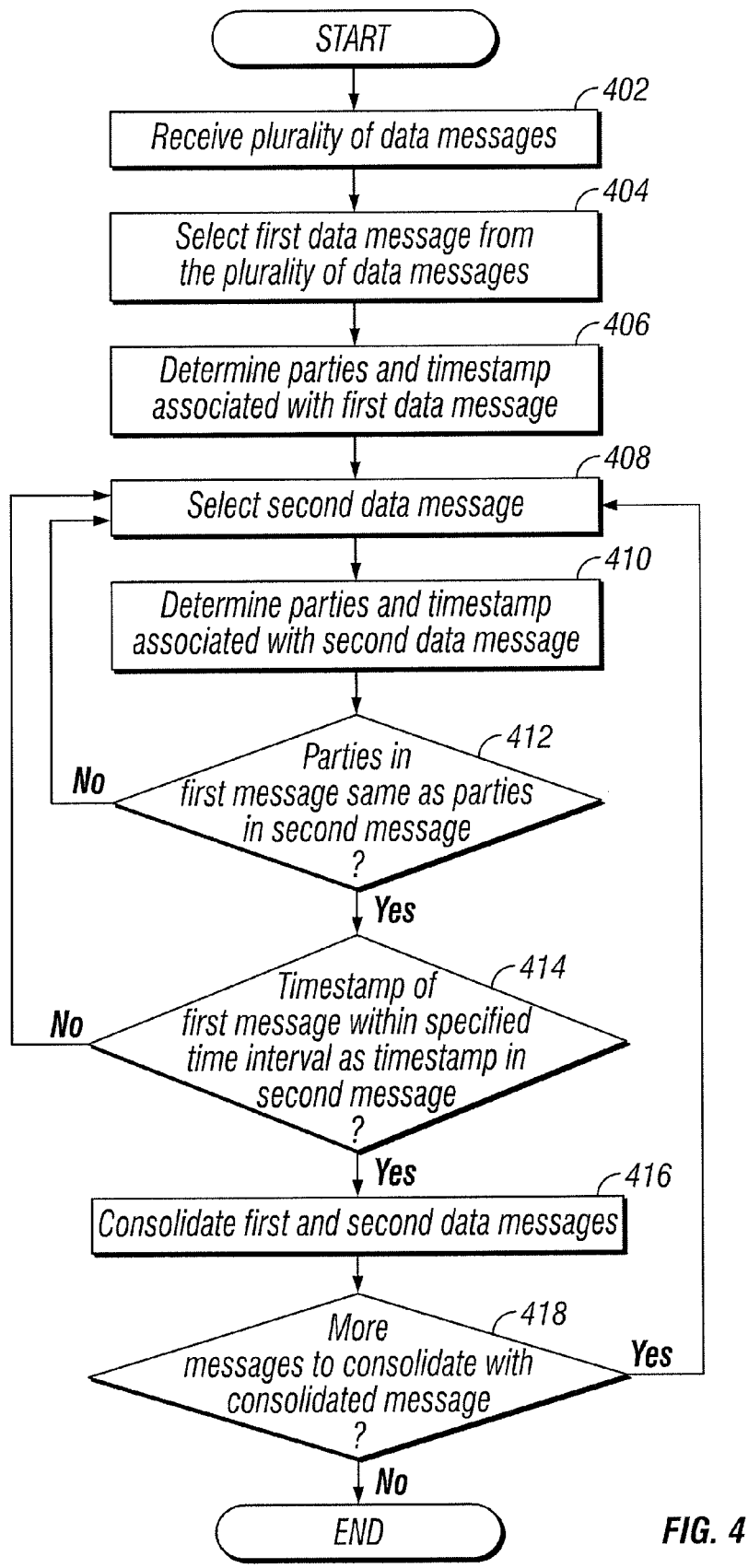
* and FIG. 4 is a flowchart illustrating a method for consolidating data messages.

FIG. 4 illustrates an example method of creating a consolidated data message 68. At step 402, consolidation server 60 receives a plurality of data messages 18. The consolidation server processor 62 may then store the plurality of data messages 18 in consolidation server memory 64. Alternatively, the plurality of data messages 18 may remain in aggregation server memory 54 and may be requested by consolidation server processor 62 when needed for the consolidation process.

At step 404, the consolidation server processor 62 determines the consolidation server criteria 66. In this example embodiment, the consolidation server criteria 66 instructs consolidation server processor 62 to group data messages 18 from the plurality of data messages 18 that share a common sender and receiver and have been sent or received within a single twenty-four-hour period ending at midnight. The consolidation server processor 62 then receives a first data message 18 from the plurality of data messages 18.

At step 406, consolidation server processor 62 determines the fields from the first data message 18 as instructed by consolidation server criteria 66. In this example embodiment, consolidation server criteria 66 instructs that the determined fields for consolidation are the sender field, the receiver field, and the timestamp field. The timestamp field may contain information such as the time, date, time zone where the message was transmitted, or any other suitable data. The consolidation server processor 62 thus determines the data associated with the sender field, the receiver field, and the timestamp field from the first data message 18.

At step 408, consolidation server processor 62 receives another data message 18 from the remaining plurality of data messages 18. This second data message 18 may be received as instructed by consolidation server criteria 66.

At step 410, the consolidation server processor 62 determines the same fields from this second data message 18 as it did for the first data message 18 (i.e., the sender field, the receiver field, and the timestamp field).

At step 412, the consolidation server processor 62 compares the sender and receiver fields in the first data message 18 and in the second data message 18. The consolidation server processor 62 determines if the sender field of the first data message 18 is the same as either the sender or receiver field of the second data message 18 in accordance with consolidation server criteria 66. If so, consolidation server processor 62 then determines if the receiver field of the first data message 18 is the same as the remaining sender or receiver field of the second data message 18 in accordance with consolidation server criteria 66. In other words, if the sender field of the first data message 18 is the same as the sender field of the second data message 18 and the receiver field of the first data message 18 is the same as the receiver field of the second data message 18, then the consolidation server criteria 66 is satisfied, and the process continues. Similarly, if the sender field of the first data message 18 is the same as the receiver field of the second data message 18 and the receiver field of the first data message 18 is the same as the sender field of the second data message 18, then the consolidation server criteria 66 is satisfied, and the process continues. Otherwise, if the consolidation server criteria 66 is not satisfied, then the process goes back to step 408. There, another data message 18 is received as the second data message 18 from the remaining plurality of data messages 18 in accordance with consolidation server criteria 66. Although not illustrated in FIG. 4, if there are no more data messages 18 that need to be compared, the process ends.

At step 414, the consolidation server processor 62 compares the timestamp field of the first data message 18 with the timestamp field of the second data message 18. If the times contained in each field satisfy the consolidation server criteria 66, then the process continues. In this example, if the timestamp from the first data message 18 is within the same twenty-four-hour period as the timestamp from the second data message 18, then the consolidation server criteria 66 is satisfied, and the process continues. The time period in consolidation server criteria 66 may be specified such that data messages 18 satisfy the consolidation server criteria 66 only if their timestamps fall within the time period on the same calendar date. If the timestamp check fails, the process returns to step 408 to receive another second data message 18 from the plurality of remaining data messages 18. Again, although not illustrated in FIG. 4, if there are no more data messages 18 that need to be compared, the process ends.

At step 416, consolidation server processor 62 consolidates the first data message 18 with the second data message 18 into a consolidated data message 68. In some embodiments, the messages may be consolidated according to the format illustrated in FIGS. 3a-3d. Any other suitable format is also envisioned by this disclosure. The consolidated server processor 62 may additionally inject certain headers into the consolidated data message; these headers may contain data associated with the sender field, receiver field, timestamp field, or data body of the first or second data message 18. These headers may be used for sorting and searching purposes.

At step 418, the consolidation server processor 62 designates the consolidated data message 68 as the first data message 18. The consolidation server processor then determines whether more messages remain that could be combined with the first data message 18 from the remaining plurality of data messages 18. If so, the process returns to step 408 to receive another second data message 18 for consideration. Otherwise, the process ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for consolidating a plurality of data messages, comprising:
   an interface operable to receive a plurality of data messages, each of the plurality of data messages comprising a user field, an outside party field, and a timestamp field, and the plurality of data messages comprising:
   a first data message, the user field associated with a first user, the outside party field associated with a first outside party, and the timestamp field associated with a first timestamp;
   a second data message, the user field associated with a second user, the outside party field associated with a second outside party, and the timestamp field associated with a second timestamp; and
   a third data message, the user field associated with the first user, the outside party field associated with the first outside party, and the timestamp field associated with a third timestamp;
   a memory operable to store the received plurality of data messages; and
   a processor communicatively coupled to the memory and operable to:
     determine a mobile device associated with at least one from the plurality of received data messages; and
     generate a confirmation message for the mobile device instructing the mobile device to delete a copy of the received data message from the mobile device;
   the interface further operable to:
     communicate the confirmation message to the mobile device;
     receive an identification of the first user, the first outside party, and a time interval;
   the processor further operable to:
     group the first data message with the third data message based at least in part upon the received identification of the first user, the received identification of the first outside party, the received identification of the time interval, the user field, the outside party field, and if the first timestamp and the third timestamp are within the received time interval; and
     combine the first data message and the third data message into a consolidated data message, wherein the first data message, the third data message, and the consolidated message are in different messaging formats.

2. The system of claim 1, wherein the processor is further operable to transmit the consolidated data message to an archive server.

3. The system of claim 2, wherein the archive server is operable to receive the consolidated data message and display the consolidated data message to a user.

4. The system of claim 1, wherein the time interval is a twenty-four-hour period.

5. The system of claim 1, wherein the consolidated data message has at least one header that is searchable and sortable, the header comprising at least one of the following:
the user field;
the outside party field; and
the timestamp field.

6. The system of claim 1, wherein:
the timestamp field associated with the first data message comprises a first date and a first time;
the timestamp field associated with the second data message comprises a second date and a second time; and
the timestamp field associated with the third data message comprises a third date and a third time.

7. The system of claim 1, wherein:
the first data message further comprises a first body field;
the third data message further comprises a third body field; and
the consolidated data message comprises:
the first timestamp;
the user field associated with the first data message;
the outside party field associated with the first data message;
the first body field;
the third timestamp;
the user field associated with the third data message;
the outside party field associated with the third data message; and
the third body field.

8. The system of claim 1, wherein the consolidated data message comprises information from the first data message appended with information from the third data message.

9. A method for consolidating a plurality of data messages, comprising:
receiving a plurality of data messages, each of the plurality of data messages comprising a user field, an outside party field, and a timestamp field, and the plurality of data messages comprising:
a first data message, the user field associated with a first user, the outside party field associated with a first outside party, and the timestamp field associated with a first timestamp;
a second data message, the user field associated with a second user, the outside party field associated with a second outside party, and the timestamp field associated with a second timestamp; and
a third data message, the user field associated with the first user, the outside party field associated with the first outside party, and the timestamp field associated with a third timestamp;
determining a mobile device associated with at least one from the plurality of received data messages;
generating a confirmation message for the mobile device instructing the mobile device to delete a copy of the received data message from the mobile device;
communicating the confirmation message to the mobile device;
receiving an identification of the first user, the first outside party, and a time interval;
grouping the first data message and the third data message based at least in part upon the received identification of the first user, the received identification of the first outside party, the received identification of the time interval, the user field, the outside party field, and if the first timestamp and the third timestamp are within the received time interval; and
combining the first data message and the third data message into a consolidated data message, wherein the first data message, the third data message, and the consolidated message are in different messaging formats.

10. The method of claim 9, further comprising:
transmitting the consolidated data message to an archive server.

11. The method of claim 10, wherein the archive server is operable to receive the consolidated data message and display the consolidated data message to a user.

12. The method of claim 9, wherein the time interval is a twenty-four-hour period.

13. The method of claim 9, wherein the consolidated data message has at least one header that is searchable and sortable, the header comprising at least one of the following:
the user field;
the outside party field; and
the timestamp field.

14. The method of claim 9, wherein:
the timestamp field associated with the first data message comprises a first date and a first time;
the timestamp field associated with the second data message comprises a second date and a second time; and
the timestamp field associated with the third data message comprises a third date and a third time.

15. The method of claim 9, wherein:
the first data message further comprises a first body field;
the third data message further comprises a third body field; and
the consolidated data message comprises:
the first timestamp;
the user field associated with the first data message;
the outside party field associated with the first data message;
the first body field;
the third timestamp;
the user field associated with the third data message;
the outside party field associated with the third data message; and
the third body field.

16. The method of claim 9, wherein the consolidated data message comprises information from the first data message appended with information from the third data message.

17. A system for consolidating a plurality of data messages, comprising:
an application stored in a memory on a device such that when executed by a hardware processor on the device is operable to:
detect if a data message is sent or received by the device;
create a copy of the data message, the copy of the data message comprising a user field, an outside party field, and a timestamp field; and
transmit the copy of the data message; and
a server, comprising a hardware server processor and a hardware server memory, the hardware server processor operable to:
receive copies of a plurality of data messages;

store the copies of the plurality of data messages in the server memory;

determine a mobile device associated with at least one from the plurality of received data messages;

generate a confirmation message for the mobile device instructing the mobile device to delete a copy of the received data message from the mobile device;

communicate the confirmation message to the mobile device:

receive an identification of the first user, the first outside party, and a time interval;

group a plurality of messages from the copies of data messages based at least in part upon the received identification of the first user, the received identification of the first outside party, the received identification of the time interval, the user field, the outside party field, and if the first timestamp and the third timestamp are within the received time interval; and combine the plurality of messages into a consolidated data message, wherein the first data message, the third data message, and the consolidated message are in different messaging formats.

18. The system of claim 17, wherein the server processor is further operable to transmit the consolidated data message to an archive server.

19. The system of claim 18, wherein the archive server is operable to receive the consolidated data message and display the consolidated data message to a user.

20. The system of claim 17, wherein the consolidated data message has at least one header that is searchable and sortable, the header comprising at least one of the following:
the user field;
the outside party field; and
the timestamp field.

21. The system of claim 17, wherein the consolidated data message comprises information from one of the plurality of messages appended with information from each of the remaining plurality of messages.

\* \* \* \* \*